March 25, 1947.      R. M. RIBLET      2,418,095
DOUBLE ROW ROLLER BEARING AND CUP SPACER THEREFOR
Filed Dec. 1, 1945

INVENTOR:
Robert M. Riblet,
By Carr Karr Gravely
HIS ATTORNEYS.

Patented Mar. 25, 1947

2,418,095

UNITED STATES PATENT OFFICE 2,418,095

DOUBLE ROW ROLLER BEARING AND CUP SPACER THEREFOR

Robert M. Riblet, Canton, Ohio, assignor to The Timken Roller Bearing Company, Canton, Ohio, a corporation of Ohio Application December 1, 1945, Serial No. 632,238

12 Claims. (Cl. 308—214)

This invention relates to roller bearings of the type comprising two sets of rollers, separate outer bearing members therefor, a C-shaped spacing washer between the opposed ends of said outer bearing members and means cooperating with said spacing washer for holding it in place. The invention has for its principal object to provide a bearing of the above type with simple and economical, quick attachable and detachable means for holding the C-shaped spacing washer in place. The invention consists in the double row roller bearing and two part spacing means therefor and in the parts and combinations and arrangements of parts hereinafter described and claimed.

Figure 1:
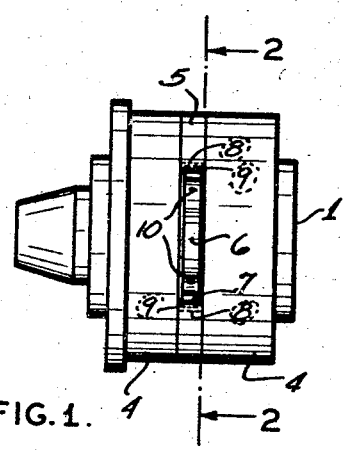
Figure 2:
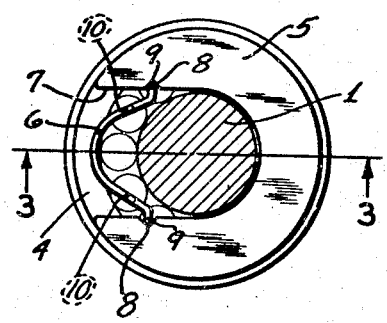
Figure 3:
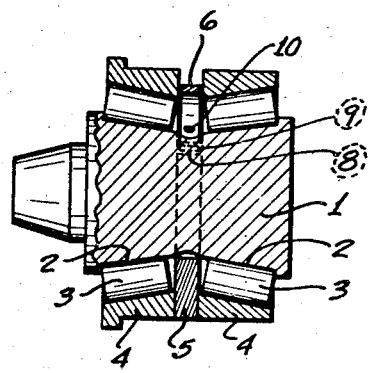

In the accompanying drawing, which forms part of this specification and wherein like symbols refer to like parts wherever they occur, Fig. 1 is a side elevational view of a double row roller bearing construction embodying my invention, Fig. 2 is a cross sectional view on the line 2—2 in Fig. 1; and Fig. 3 is a central longitudinal sectional view on the line 3—3 in Fig. 2.

In the accompanying drawing my invention is shown embodied in a double row tapered roller bearing comprising a double inner bearing member or cone 1 having conical raceway portions 2 thereon that taper toward the middle of the bearing, a circular series of conical rollers 3 mounted on each raceway and a separate cup or outer bearing member 4 for each series of rollers. The present invention is concerned with a two part spacer that is interposed between the opposed ends of the bearing cups 4 for holding them in proper running position.

The two part spacer comprises a C-washer 5 and a spring retainer 6 therefor. The C-washer 5 comprises an annular body having an opening 7 through one side thereof so as to permit the washer to be inserted over the inner bearing member 1. The retainer 6 comprises a bowed plate spring which is of less width than the thickness of the C-washer 5 and is mounted in the side opening 7 of said washer with its ends seated in notches or recesses 8 provided therefor in the opposing sides of said opening adjacent to but clear of the inner bearing member.

The bowed spring steel retainer 6 is preferably bent into substantially U-shaped form with outwardly bent ends 9 that seat in the recesses 8 in the sides of the side opening 7 in the C-washer. The retainer 6 is compressed endwise to fit in the side opening 7 in the C-washer and is released when the ends 9 of said retainer are opposite the notches 8 in the side of said opening so that said ends snap into said notches and bear resiliently against the bottoms thereof. When thus fastened in the side opening of the C-washer, the retainer lies entirely within said opening between the mouth thereof and the inner bearing member thereon. As shown in the drawing, the sides of the U-shaped body portion of the retainer 6 are provided with holes 10 adapted to be engaged by a suitable tool (not shown) for compressing said retainer when it is desired to mount it in or remove it from the C-washer 5.

By the arrangement described, the C-shaped spacing washer is quickly and easily locked in place around the inner bearing member and between the opposed ends of the outer bearing members merely by compressing the retainer and slipping it into the side opening in said washer until the ends of said retainer snap into the notches provided therefor in the sides of said opening. The notches in the side opening of the C-shaped spacer are located adjacent to the inner bearing member and thus position the outer bent portions near enough to said member so as to loosely centralize the spacer in the bearing; and the manner in which these bent portions come into contact with said inner bearing member tend to tighten the ends of the retainer in the notches. The retaining clip is made of a spring steel stamping and is readily bent into shape. The retainer is narrower than the thickness of the C-washer, thus providing spaces for the flow of lubricant; and any pressure on the outer end of the retainer tends to tighten the ends thereof in the recesses in the sides of the side opening in said washer. The retainer is quickly and easily removed from the C-washer merely by pressing the sides of the U-shaped body thereof inwardly far enough to release the ends of the retainer from the retaining notches in the side opening of said washer and then withdrawing the compressed retainer therefrom.

What I claim is:

1. A two part cup spacer for a double row roller bearing comprising an annular body having an opening through one side thereof, and a spring retainer adapted to be inserted in said opening under compression with its end portions bearing resiliently against opposite sides thereof.

2. The combination set forth in claim 1 wherein opposite sides of said opening have recesses therein and said end portions of said spring retainer are adapted to seat in said recesses.

3. The combination set forth in claim 1 wherein opposite sides of said openings have recesses therein and said end portions of said spring retainer are adapted to seat in said recesses, and said spring retainer comprises a substantially U-shaped body with outwardly extending ends that form said end portions.

4. The combination set forth in claim 1 wherein opposite sides of said openings have recesses therein and said end portions of said spring retainer are adapted to seat in said recesses, and said spring retainer comprises a strip of spring material bent into substantially U-shape form with outwardly bent ends that form said end portions and with openings adapted to receive a tool for compressing said U-shape retaining spring.

5. A two part spacer for a double roller bearing compressing a washer having an opening through one side thereof, and a bowed plate spring retainer adapted to be inserted in said opening crosswise thereof with its ends bearing against the sides thereof.

6. A two part cup spacer for a double row roller bearing comprising an annular body having an opening through one side thereof and notches in opposite sides of said opening, and a retainer comprising a substantially U-shaped body adapted to be inserted crosswise in said opening and having outstanding end portions adapted to seat in said notches.

7. A double row roller bearing construction comprising two circular series of rollers, a separate outer bearing member for each series of rollers, said outer bearing members having their opposed ends spaced apart, an inner member having raceways for said rollers, a spacer between the opposed ends of said cups, said spacer having an opening through one side thereof, thereby permitting said spacer to be inserted over said inner member, and a spring retainer mounted in said opening under compression with its ends bearing resiliently against opposite sides thereof.

8. The combination set forth in claim 7, wherein opposite sides of said opening have recesses therein and said spring retainer has its end portions seated in said recesses.

9. The combination set forth in claim 7, wherein opposite sides of said openings have recesses therein and said spring retainer comprises a strip of spring material bent into substantial U-shape form with outwardly extending ends that form said end portions.

10. The combination set forth in claim 7, wherein opposite sides of said openings have recesses therein and said spring retainer comprises a strip of spring material bent into substantial U-shape form with outwardly extending ends that form said end portions and with openings adapted to receive a tool for compressing said U-shape spring retainer.

11. A double row roller bearing construction comprising two circular series of rollers, a separate outer bearing member for each series of rollers, said outer bearing members having their opposed ends spaced apart, an inner member having raceways for said rollers, a spacer between the opposed ends of said cups, said spacer having an opening through one side thereof, thereby permitting said spacer to be inserted over said inner member, said opening having recesses in opposite sides thereof and a retainer mounted in said opening crosswise thereof with its ends seated in said recesses.

12. A double row roller bearing construction comprising two circular series of rollers, a separate outer bearing member for each series of rollers, said outer bearing members having their opposed ends spaced apart, an inner member having raceways for said rollers, a spacer between the opposed ends of said bearing members, said spacer having an opening through one side thereof, thereby permitting said spacer to be inserted over said inner member, said opening having recesses in opposite sides thereof adjacent to but clear of said inner member, and a retainer comprising a substantially U-shaped body mounted in said opening crosswise thereof and having outstanding end portions seated in said recesses.

ROBERT M. RIBLET.

REFERENCES CITED

The following references are of record in the file of this patent:

UNITED STATES PATENTS

| Number | Name | Date |
| --- | --- | --- |
| 2,128,685 | Slusser | Aug. 30, 1938 |
| 2,142,946 | Klamp | Jan. 3, 1939 |
| 2,178,843 | Slusser | Nov. 7, 1939 |